US012652125B2

(12) United States Patent
Cui

(10) Patent No.: US 12,652,125 B2
(45) Date of Patent: Jun. 9, 2026

(54) METHOD AND DEVICE TO IMPROVE COVERAGE ENHANCEMENT OF REPEATED DATA TRANSMISSION

(71) Applicant: GUANGDONG OPPO MOBILE TELECOMMUNICATIONS CORP., LTD., Dongguan (CN)

(72) Inventor: Shengjiang Cui, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 229 days.

(21) Appl. No.: 18/216,597

(22) Filed: Jun. 30, 2023

(65) Prior Publication Data

US 2023/0344556 A1      Oct. 26, 2023

Related U.S. Application Data

(63) Continuation of application No. PCT/CN2021/084186, filed on Mar. 30, 2021.

(51) Int. Cl.
H04L 1/08        (2006.01)
H04W 72/232      (2023.01)
H04W 76/20       (2018.01)

(52) U.S. Cl.
CPC ............. H04L 1/08 (2013.01); H04W 72/232 (2023.01); H04W 76/20 (2018.02)

(58) Field of Classification Search
CPC ......... H04L 1/08; H04L 1/1858; H04L 1/189; H04L 5/0091; H04L 5/0044; H04L 5/00; H04W 76/20; H04W 72/232; H04W 36/00; H04W 72/00
See application file for complete search history.

(56) References Cited

U.S. PATENT DOCUMENTS

2007/0242647 A1* 10/2007 Bennett ................. H04W 88/04
                                                    370/338
2021/0219348 A1*  7/2021 Zhang ........................ H04L 1/18
2021/0345362 A1* 11/2021 Kim ...................... H04L 5/0012

FOREIGN PATENT DOCUMENTS

| CN | 110149661 A | 8/2019 |
| CN | 110278614 A | 9/2019 |
| CN | 111756496 A | 10/2020 |
| CN | 112040559 A | 12/2020 |
| WO | 2020033785 A1 | 2/2020 |

OTHER PUBLICATIONS

NPL Document, Enhancements on PUSCH repetition type A (Year: 2021).*

(Continued)

*Primary Examiner* — Mewale A Ambaye
(74) *Attorney, Agent, or Firm* — BAYES PLLC

(57) ABSTRACT

Provided is a method for indicating repeated transmission. A network device transmits first information to a terminal device, and the terminal device receives the first information transmitted by the network device. The first information is used to determine a parameter of enhanced data transmission and/or a repeated transmission mode.

15 Claims, 9 Drawing Sheets

L = 6 symbols, and a nominal PUSCH is repeatedly transmitted four times slot boundary

| 1st nominal PUSCH repetition | | 2nd nominal PUSCH repetition | | 3rd nominal PUSCH repetition | | 4th nominal PUSCH repetition | |

(56)  References Cited

OTHER PUBLICATIONS

China Telecom: "Enhancements on PUSCH repetition type A", 3GPP Draft; R1-2100915, 3rd Generation Partnership Project (3GPP), Mobile Competence Centre; 650, Route Des Lucioles; F-06921 Sophia-Antipolis Cedex; France, vol. RAN WG1, No. e-Meeting; Jan. 25, 2021-Feb. 5, 2021, Jan. 18, 2021 (Jan. 18, 2021), XP051970579, sections 1 and 2. 3 pages.
Panasonic: "Discussion on enhancements on PUSCH repetition Type A", 3GPP Draft; R1-2101017, 3rd Generation Partnership Project (3GPP), Mobile Competence Centre; 650, Route Des Lucioles; F-06921 Sophia-Antipolis Cedex; France, vol. RAN WG1, No. e-Meeting; Jan. 25, 2021-Feb. 5, 2021, Jan. 18, 2021 (Jan. 18, 2021), XP051970603, sections 1 and 2. 4 pages.
Oppo: "Supporting TB over multi-slot PUSCH", 3GPP Draft; R1-2100173, 3rd Generation Partnership Project (3GPP), Mobile Competence Centre; 650, Route Des Lucioles; F-06921 Sophia-Antipolis Cedex; France, vol. RAN WG1, No. e-Meeting; Jan. 25, 2021-Feb. 5, 2021, Jan. 18, 2021 (Jan. 18, 2021), XP051970291, section 2.1. 4 pages.
Sharp: "TB processing over multi-slot PUSCH", 3GPP Draft; R1-2101546, 3rd Generation Partnership Project (3GPP), Mobile Competence Centre; 650, Route Des Lucioles; F-06921 Sophia-Antipolis Cedex; France, vol. RAN WG1, No. e-Meeting; Jan. 25, 2021-Feb. 5, 2021, Jan. 19, 2021 (Jan. 19, 2021), XP051971711, the whole document. 2 pages.
Supplementary European Search Report in the European application No. 21933699.7, mailed on Feb. 15, 2024. 12 pages.
"NR;Physical layer procedures for data;(Release 16)", 3GPP TS 38.214 V16.3.0 (Sep. 2020). 165pages.
Lenovo. "Indication of early PDSCH decoding success for Rel-13 eMTC", 3GPP TSG RAN WG1 Meeting #82BIS R1-155809, Oct. 9, 2015 (Oct. 9, 2015), sections 2-4, and figure 1. 5 pages.
Lenovo. "Indication of early PDSCH decoding success for Rel-13 eMTC", 3GPP TSG RAN WG1 Meeting #83 R1-156726, Nov. 22, 2015 (Nov. 22, 2015), sections 2-4, and figure 1. 5 pages.
Oppo, "Enhancements on PUSCH repetition type A", 3GPP TSG RAN WG1 #104-e R1-2100172, Feb. 5, 2021 (Feb. 5, 2021), entire document. 6 pages.
International Search Report in the international application No. PCT/CN2021/084186, mailed on Nov. 10, 2021. 8 pages with English translation.
English translation of the Written Opinion of the International Search Authority in the international application No. PCT/CN2021/084186, mailed on Nov. 10, 2021. 10 pages with English translation.

* cited by examiner

100

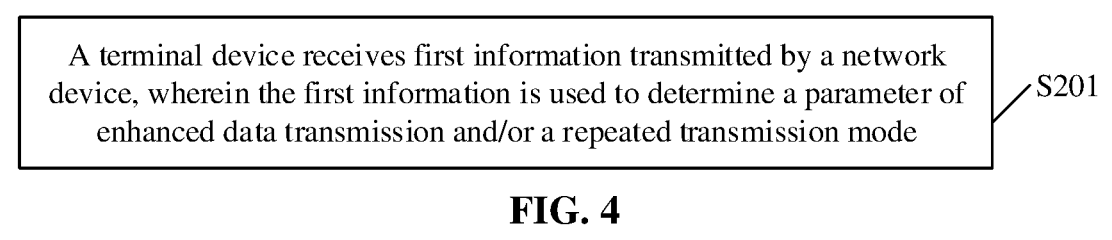

A terminal device receives first information transmitted by a network device, wherein the first information is used to determine a parameter of enhanced data transmission and/or a repeated transmission mode — S201

FIG. 4

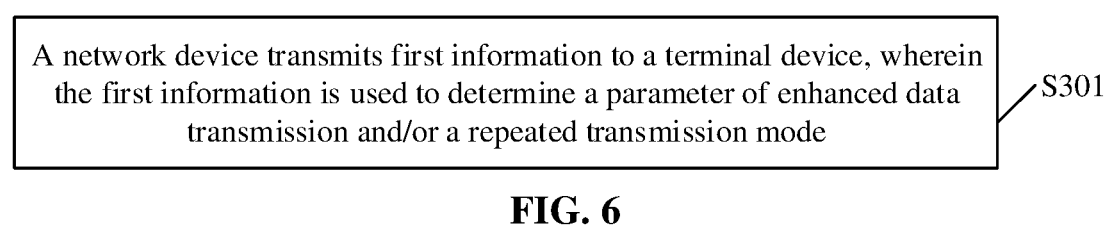

A network device transmits first information to a terminal device, wherein the first information is used to determine a parameter of enhanced data transmission and/or a repeated transmission mode    S301

FIG. 6

Terminal device 400

Receiving unit 401

FIG. 7

Network device 500

Transmitting unit 501

FIG. 8

METHOD AND DEVICE TO IMPROVE COVERAGE ENHANCEMENT OF REPEATED DATA TRANSMISSION

CROSS-REFERENCE TO RELATED APPLICATION

This is a continuation application of International Patent Application No. PCT/CN2021/084186 filed on Mar. 30, 2021, the disclosure of which is hereby incorporated by reference in its entirety.

BACKGROUND

In a new radio (NR) system, how to improve the coverage enhancement of repeated data transmission is a goal that has been pursued.

SUMMARY

The present application relates to the technical field of wireless communications. Embodiments of the present application provide a method for indicating repeated transmission, an electronic device, and a storage medium, which can improve coverage enhancement of repeated data transmission.

In a first aspect, an embodiment of the present application provides a method for indicating repeated transmission, including: a terminal device receiving first information transmitted by a network device. The first information is used to determine a parameter of enhanced data transmission and/or a repeated transmission mode.

In a second aspect, an embodiment of the present application provides a method for indicating repeated transmission, including: a network device transmitting first information to a terminal device. The first information is used to determine a parameter of enhanced data transmission and/or a repeated transmission mode.

In a third aspect, an embodiment of the present application provides a terminal device, including: a transceiver. The transceiver is configured to receive first information transmitted by a network device. The first information is used to determine a parameter of enhanced data transmission and/or a repeated transmission mode.

In a fourth aspect, an embodiment of the present application provides a network device, including: a transceiver. The transceiver is configured to transmit first information to a terminal device. The first information is used to determine a parameter of enhanced data transmission and/or a repeated transmission mode.

BRIEF DESCRIPTION OF THE DRAWINGS

FIG. 4 is a schematic diagram of an optional processing flow of a method for indicating repeated transmission provided in an embodiment of the present application.

FIG. 6 is a schematic diagram of another optional processing flow of a repeated transmission indicating method provided in an embodiment of the present application.

FIG. 7 is a schematic diagram of an optional composition structure of a terminal device provided in an embodiment of the present application.

FIG. 8 is a schematic diagram of an optional composition structure of a network device provided in an embodiment of the present application.

DETAILED DESCRIPTION

In order to understand the features and technical contents of embodiments of the present application in more detail, the implementation of the embodiments of the present application will be described in detail below in conjunction with the accompanying drawings. The accompanying drawings are only for reference and description, and are not intended to limit the embodiments of the present application.

Before describing the embodiments of the present application, a brief description will be given for relevant contents.

In Release 15 (Rel15, R15), physical uplink shared channel (PUSCH) enhancement is proposed. In order to enhance the reliability of uplink transmission, R15 introduces slot aggregation PUSCH repeated transmission. Slot aggregation PUSCH repeated transmission means that the same transport block is repeatedly transmitted K times with different redundancy versions. A network device can configure a repetition number K for a terminal device by using an upper layer parameter PUSCH repeated transmission value (pusch-Aggregation Factor). The terminal device repeatedly transmits the same transport block over K consecutive slots, and a PUSCH replica bearing the transport block in each slot occupies the same symbol in time domain. As shown in Table 1 below, the redundancy version (RV) of the first PUSCH replica is indicated by uplink grant signaling, and the RVs of the remaining PUSCH replicas are arranged in a sequence of $\{0, 2, 3, 1\}$.

TABLE 1

| Redundancy version settings when pusch-AggregationFactor is greater than 1 | | | | |
| --- | --- | --- | --- | --- |
| | $RV_{id}$ to be applied to the nth transmission | | | |
| $RV_{id}$ indicated by DCI scheduling a PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 1:
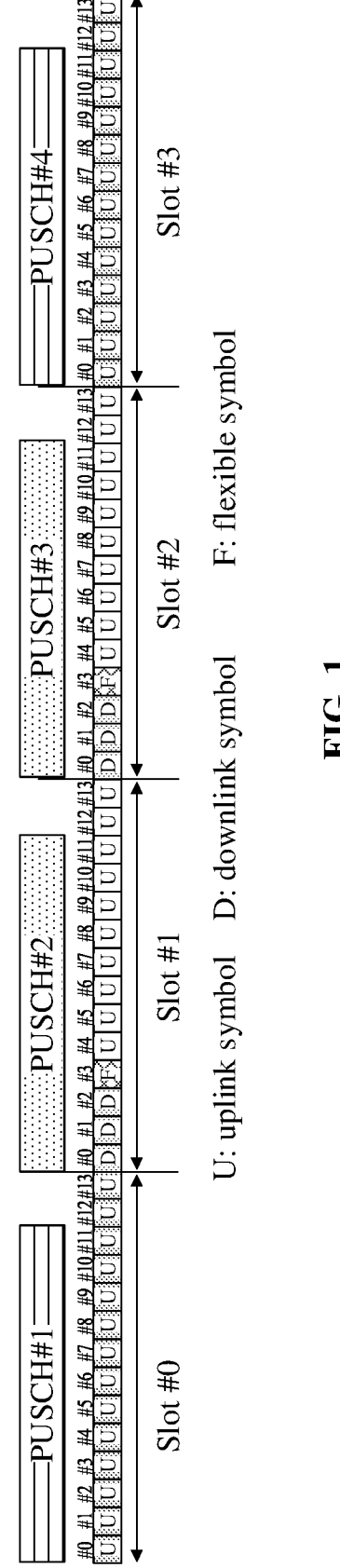
FIG. 1 is a schematic diagram of slot aggregation PUSCH repeated transmission in R15 of the present application.

If there is at least one semi-static downlink symbol in a time-domain resource corresponding to a PUSCH replica in a slot, then the PUSCH will not be transmitted in that slot. FIG. 1 shows a schematic diagram of slot aggregation PUSCH repeated transmission in R15. As shown in FIG. 1, the network device configures that the terminal device repeatedly transmits a transport block four times, and a PUSCH replica occupies symbols #0 to #11 in each slot. Symbols #0 to #2 in slot #1 and slot #2 are semi-static downlink symbols, and thus the second PUSCH repetition to be transmitted in slot #1 and the third PUSCH repetition to be transmitted in slot #2 are discarded and not transmitted.

In R15, for slot aggregation PUSCH repetition for uplink grant-free scheduling, the number of repetitions of a transport block is configured by an upper layer parameter RepK.

PUSCH enhancement in R16 includes Type B-based PUSCH repeated transmission and Type A-based PUSCH repeated transmission.

In Type B-based PUSCH repeated transmission, a network device transmits an uplink grant or a grant-free indication to indicate one or a plurality of nominal PUSCH repeated transmissions. A terminal device transmits one or a plurality of actual PUSCH replicas in one slot, or transmits two or more actual PUSCH replicas in a plurality of consecutive available slots. When the network device schedules uplink data transmission through downlink control information (DCI), a time-domain resource allocation (TDRA) table can be carried in the DCI. The size of an information field of the TDRA is 4 bits, which may indicate that there are 16 different rows in the resource allocation table, each row including a different combination of resource allocations. A column may be added in the TDRA table to indicate the number of repetitions of Type B-based PUSCH repeated transmission (numberofrepetition), and the value of numberofrepetition may be $\{1, 2, 3, 4, 7, 8, 12, 16\}$. Uplink scheduling signaling or the first type of grant-free configuration information indicates a start symbol S and duration L of the first nominal PUSCH replica, and the duration L of each nominal PUSCH replica is the same, where $0 \leq S \leq 13$ and $1 \leq L \leq 14$. The upper layer signaling uses 4 bits to respectively indicate S and L, allowing $S+L>14$. Transport block sizes (TBSs) of transport blocks in the nominal PUSCH replica and the actual PUSCH replica are determined according to the time-domain length L of the nominal PUSCH replica. Starting from the second nominal PUSCH, a start symbol of the nominal PUSCH replica is the next symbol of a stop symbol of a previous nominal PUSCH replica.

Figure 2:
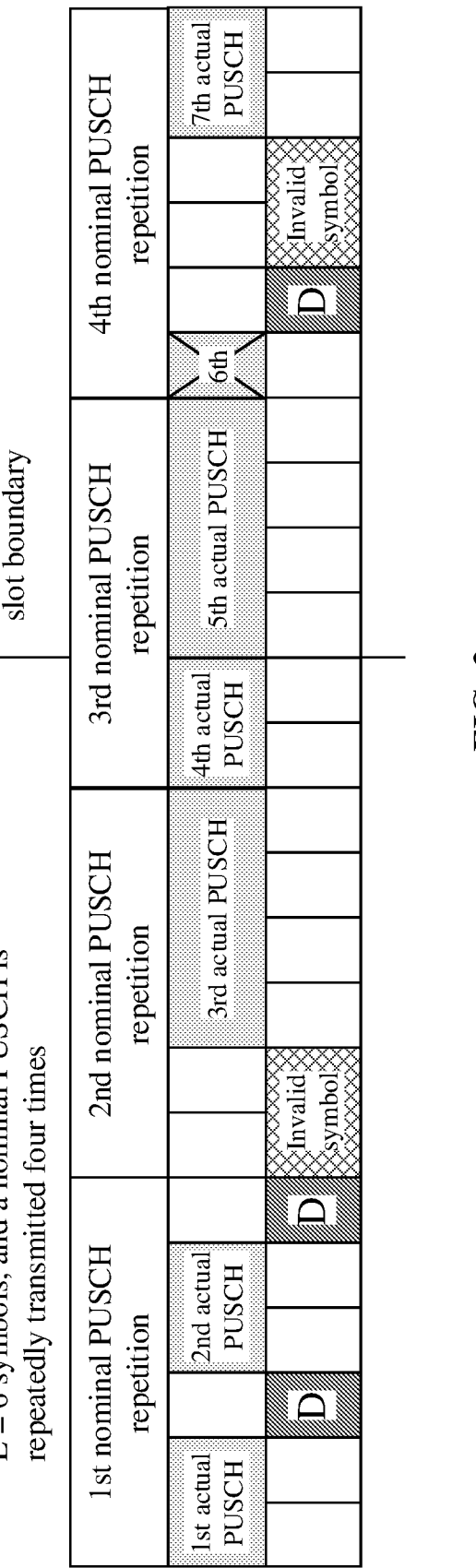
FIG. 2 is a schematic diagram of time-domain resources for Type B-based PUSCH repeated transmission in R16 of the present application.

Before the terminal device determines time-domain resources of the actual PUSCH replica, the terminal device needs to determine an invalid symbol, and symbols other than the invalid symbol may be considered as potentially valid symbols. If the number of consecutive potential valid symbols for a nominal PUSCH replica in a slot is greater than 0, an actual PUSCH replica may be mapped, and time-domain resources of a nominal PUSCH replica may include time-domain resources of one or a plurality of actual PUSCH replicas. The terminal device does not transmit an actual PUSCH replica of a single symbol unless the single symbol is the duration L of the nominal PUSCH replica indicated by the network device. FIG. 2 shows a schematic diagram of time-domain resources of Type B-based PUSCH repeated transmission in R16. As shown in FIG. 2, a PUSCH cannot be transmitted across a slot boundary, and the transmission of the PUSCH is stopped at downlink symbols and invalid symbols. When the length of symbols the scheduled PUSCH replica is greater than 1, if there is only one consecutive symbol, then the PUSCH is not transmitted.

In Type A-based PUSCH repeated transmission, R16 supports adding a column "numberofrepetitions" in a time-domain resource allocation table configured by upper layer signaling to indicate the number K of Type A-based PUSCH repeated transmissions. If numberofrepetitions is not configured, the number of repetitions K is determined by an upper layer parameter pusch-AggregationFactor. If both the numberofrepetitions and pusch-AggregationFactor parameters are not configured, the number of repetitions K is equal to 1.

For grant-free PUSCH scheduling, a manner of determining a grant-free PUSCH repetition type may be: when an upper layer parameter PUSCHRepTypeIndicatorForType1Configuredgrant is configured as pusch-RepTypeB, it indicates that the grant-free PUSCH repetition type is Type B-based PUSCH repetition, otherwise the grant-free PUSCH repetition type is Type A-based PUSCH repetition.

A manner of determining the number of grant-free repetitions may be: if there is a numberofrepetitions in the time-domain resource allocation table, the nominal number of repeated transmissions of a PUSCH is determined by the TDRA table, otherwise the number of repetitions is determined by an upper layer parameter repK.

The number of physical uplink shared channel (PUSCH) or physical downlink shared channel (PDSCH) repeated transmissions is usually semi-statically configured, and the repeatedly transmitted PUSCH covers consecutive slots; therefore, when repeated transmissions and flexible slot structures are used at the same time, the repetition of some slots will be ignored. For example, when available symbols in a slot do not meet requirements, if uplink repeated transmission is required, and the available symbols in the slot can only be used for downlink transmission, but not for uplink transmission, then repeated transmission in the slot is ignored, that is, repeated transmission is not performed in the slot. In some scenarios, such as a scenario of a time-division duplex (TDD) system, a configured number of repeated transmissions cannot achieve an ideal coverage enhancement effect. Due to the limitation of an actual frame structure, even if a large number of repeated transmissions is configured, there will be no effect of repeated transmissions in multiple slots, or even repeated transmission will not be performed. For example, in a DDDSU frame structure, if the number of PUSCH repeated transmissions is set to 4, only one effective transmission may be performed in four consecutive slots, and thus the coverage of a TDD system is excessively restricted, which affects the deployment efficiency of the TDD system. Similarly, a frequency-division duplex (FDD) system configured with a flexible frame structure also has the above problems.

In order to solve the problem of limited coverage, one option is to increase a maximum number of repetitions supported by a protocol, such that a larger number of repetitions may be configured. Using transmission of a PUSCH as an example, for some frame structures, such as a DDDDDDDSUU frame structure, if it is necessary to ensure 16 actual repeated transmissions, the number of repetitions needs to be configured as 72. In that case, the maximum number of times that the protocol needs to support needs to be quite large. Another option is to change a counting manner (also called deferred transmission), that is, only slots in which repeated transmission is actually performed will be counted for the number of repetitions, and for slots in which a PUSCH cannot be transmitted, the number of repetitions will not be counted. However, for some frame structures, such as DDDDDDDSUU, for every two actual repetitions added, it is necessary to defer 10 slots, which may cause a relatively large delay.

On that basis, embodiments of the present application provide a method for indicating repeated transmission. The technical solution of the embodiments of the present application can be applied to various communication systems, for example, a global system of mobile communication (GSM), a code-division multiple-access (CDMA) system, a wideband code-division multiple-access (WCDMA) system, a general packet radio service (GPRS), an LTE system, an LTE frequency-division duplex (FDD) system, an LTE time-division duplex (TDD) system, an advanced long-term evolution (LTE-A) system, an NR system, an evolution system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area network (WLAN), wireless fidelity (WiFi), a next-generation communication system, or other communication systems, etc.

The system architecture and service scenarios described in the embodiments of the present application are intended to more clearly illustrate the technical solutions of the embodiments of the present application, and do not constitute limitations to the technical solutions provided in the embodiments of the present application. A person skilled in the art can understand that, with the evolution of architectures and the emergence of new service scenarios, the technical solutions provided in the embodiments of the present application are also applicable to similar technical problems.

The network device involved in the embodiments of the present application can be a common base station (such as a NodeB or an eNB or a gNB), a new radio controller (NR controller), a centralized network element (centralized unit), a new radio base station, a remote radio module, a micro base station, a relay, a distributed network element (distributed unit), a transmission reception point (TRP), a transmission point (TP), or any other device. The embodiments of the present application do not limit the specific technology and specific device form adopted by the network device. For ease of description, in all embodiments of the present application, the aforementioned apparatuses for providing wireless communication functions for the terminal device are collectively referred to as network devices.

In the embodiments of the present application, the terminal device can be any terminal, for example, the terminal device can be user equipment for machine-type communication. That is to say, the terminal device can also be referred to as user equipment (UE), a mobile station (MS), a mobile terminal, a terminal, etc. The terminal device can communicate with one or a plurality of core networks via a radio access network (RAN). For example, the terminal device can be a mobile phone (also referred to as a "cellular" phone), a computer with a mobile terminal, etc. For example, the terminal device can also be a portable, pocket-sized, handheld, computer built-in, or vehicle-mounted mobile device that exchanges language and/or data with a radio access network. There is no specific limitation in the embodiments of the present application.

Optionally, the network device and the terminal device can be deployed on land, including indoor or outdoor environments and handheld or vehicle-mounted configurations; or the network device and the terminal device can be deployed on water; or the network device and the terminal device can be deployed in the air on aircrafts, balloons, and artificial satellites. The embodiments of the present application do not limit application scenarios of the network device and the terminal device.

Optionally, communication between a network device and a terminal device and between terminal devices can be performed over licensed spectra, or can be performed over unlicensed spectra, or can be performed over both licensed spectra and unlicensed spectra. Communication between a network device and a terminal device and between terminal devices can be performed over frequency spectra below 7 gigahertz (GHz), or can be performed over frequency spectra above 7 GHz, or can be performed over both frequency spectra below 7 GHz and frequency spectra above 7 GHz. The embodiments of the present application do not limit the frequency spectrum resources used between the network device and the terminal device.

Generally speaking, the number of connections supported by traditional communication systems is limited and easy to implement. However, with the development of communication technology, mobile communication systems will not only support traditional communication, but also support, for example, device-to-device (D2D) communication, machine-to-machine (M2M) communication, machine-type communication (MTC), and vehicle-to-vehicle (V2V) communication, etc. The embodiments of the present application can also be applied to those communications systems.

Figure 3:
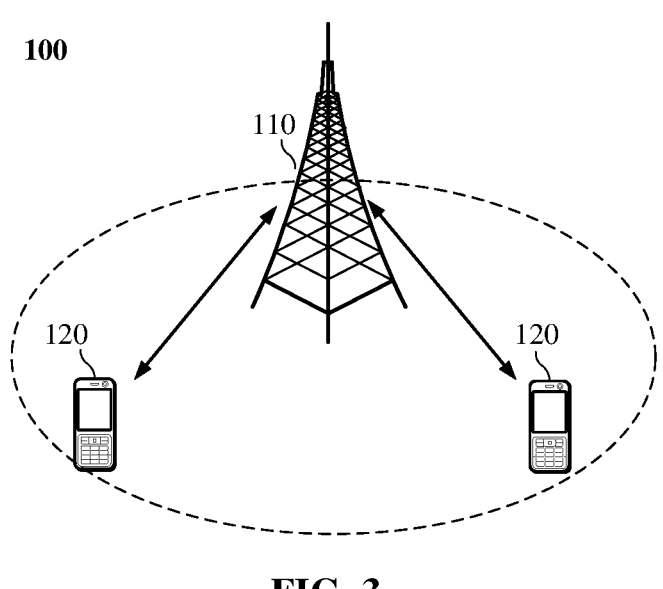
FIG. 3 is a schematic diagram of a communication system provided in an embodiment of the present application.

Exemplarily, a communication system 100 applied in an embodiment of the present application is shown in FIG. 3. The communication system 100 may include a network device 110, and the network device 110 may be a device that communicates with a terminal device 120 (or referred to as a communication terminal or a terminal). The network device 110 can provide communication coverage for a particular geographic region, and can communicate with a terminal device located within the coverage region. Optionally, the network device 110 can be a base station (base transceiver station, BTS) in a GSM system or a CDMA system, or a base station (NodeB, NB) in a WCDMA system, or an evolved base station (evolutional node B, eNB or eNodeB) in an LTE system, or a wireless controller in a cloud radio access network (CRAN), or the network device can be a mobile switching center, a relay station, an access point, a vehicle-mounted device, a wearable device, a hub, a switch, a bridge, a router, a network-side device in a 5G network, or a network device in a future evolved public land mobile network (PLMN), etc.

The communication system 100 further includes at least one terminal device 120 located within the coverage range of the network device 110. The "terminal device" as used herein includes, but is not limited to, an apparatus which can be connected via a wired line, such as a public switched telephone network (PSTN), a digital subscriber line (DSL), a digital cable, or a direct cable; and/or another data connection/network; and/or a wireless interface, such as a cellular network, a wireless local area network (WLAN), a digital TV network such as a DVB-H network, a satellite network, or an AM-FM broadcast transmitter; and/or a device of another terminal device configured to receive/transmit a communication signal; and/or an Internet of Things (IoT) device. A terminal device configured to communicate over a wireless interface may be referred to as a "wireless communication terminal", a "wireless terminal", or a "mobile terminal". Examples of the mobile terminal include, but are not limited to, a satellite or cellular phone; a personal communications system (PCS) terminal that can combine a cellular radio telephone with data processing, fax, and data communication capabilities; a PDA that can include a radio telephone, a pager, Internet/intranet access, a Web browser, a memo pad, a calendar, and/or a Global Positioning System (GPS) receiver; and a conventional laptop and/or handheld receiver or other electronic apparatuses including a radio telephone transceiver. The terminal device can refer to an access terminal, user equipment (UE), a user unit, a user station, a mobile station, a mobile site, a remote station, a remote terminal, a mobile device, a user terminal, a terminal, a wireless communication device, a user agent, or a user apparatus. The access terminal can be a cellular phone, a cordless phone, a Session Initiation Protocol (SIP) phone, a wireless local loop (WLL) station, a personal digital assistant (PDA), a handheld device with a wireless communication function, a computing device, or another processing device connected to a wireless modem, a vehicle-mounted device, a wearable device, a terminal device in a 5G network or a terminal device in a future evolved PLMN, and the like.

Optionally, Device-to-Device (D2D) communication can be performed between terminal devices 120.

Optionally, a 5G system or a 5G network may also be referred to as an NR system or an NR network.

FIG. 3 illustratively shows one network device and two terminal devices. Optionally, the communication system 100 may include a plurality of network devices, and the coverage range of each network device may include other numbers of terminals, which is not limited in the embodiments of the present application.

Optionally, the communication system 100 may further include a network controller, a mobile management entity, and other network entities. The embodiment of the present application is not limited thereto.

It should be understood that a device having a communication function in the network/system in the embodiment of the present application may be referred to as a communication device. Using the communication system 100 shown in FIG. 3 as an example, the communication device may include a network device 110 and a terminal device 120 with communication functions, and the network device 110 and the terminal device 120 may be the specific devices described above, which will not be repeated herein. The communication device may also include other devices in the communication system 100, such as a network controller, a mobility management entity, and other network entities, which are not limited in the embodiments of the present application.

FIG. 4 shows an optional processing flow of a method for indicating repeated transmission provided in an embodiment of the present application. As shown in FIG. 4, the method may at least include the following operation S201.

In S201, a terminal device receives first information transmitted by a network device. The first information is used to determine a parameter of enhanced data transmission and/or a repeated transmission mode.

In some embodiments, the first information may be carried in upper layer signaling, and the upper layer signaling may be any one of Radio Resource Control (RRC) signaling, a Media Access Control (MAC) control element (CE), and downlink control information (DCI). During specific implementation, the first information may be a column of parameters newly added in a TDRA table. Optionally, when the first information is carried in upper layer signaling, the first information may be configured in the same or similar manner as aggregationFactor carried in upper layer signaling.

In some embodiments, the data transmission may be a PUSCH, or may be a PDSCH.

In some embodiments, the repeated transmission mode may include at least one of: a first mode, a second mode, and a third mode. The first mode includes: counting the number of repeated transmissions on the basis of consecutive time-domain units. The second mode includes: counting the number of repeated transmissions on the basis of time-domain units available for repeated transmission. The third mode includes: determining a transport block size on the basis of at least two slots in transport block (TB) processing over multi-slot (TBoMS). The time-domain unit may be a symbol, a slot, a slot group, a subframe, a frame, and the like. For ease of description, in the present application, the first mode is referred to as Type 0, the second mode is referred to as Type 1, and the third mode is referred to as Type 2.

For the first mode, one time-domain unit may be regarded as one repeated transmission, and considering that repeated transmission may not be actually performed in some time-domain units, a large number of repeated transmissions may be configured. Still using FIG. 1 as an example, if the terminal device needs to repeatedly transmit a transport block four times, the PUSCH replica occupies symbols #0 to #11 in each slot. Symbols #0 to #2 in slot #1 and slot #2 are semi-static downlink symbols, and thus the second PUSCH repetition to be transmitted in slot #1 and the third PUSCH repetition to be transmitted in slot #2 are discarded and not transmitted. In that case, the network device may configure the number of repeated transmissions to be 8 times. When the number of repeated transmissions is counted on the basis of consecutive time-domain units, the terminal device transmits eight repeated transmissions of a transport block, and actually transmits four repeated transmissions of the transport block. When repeated transmission is performed in the first mode, a delay requirement of the system may be guaranteed by setting the number of repeated transmissions.

Figure 5:
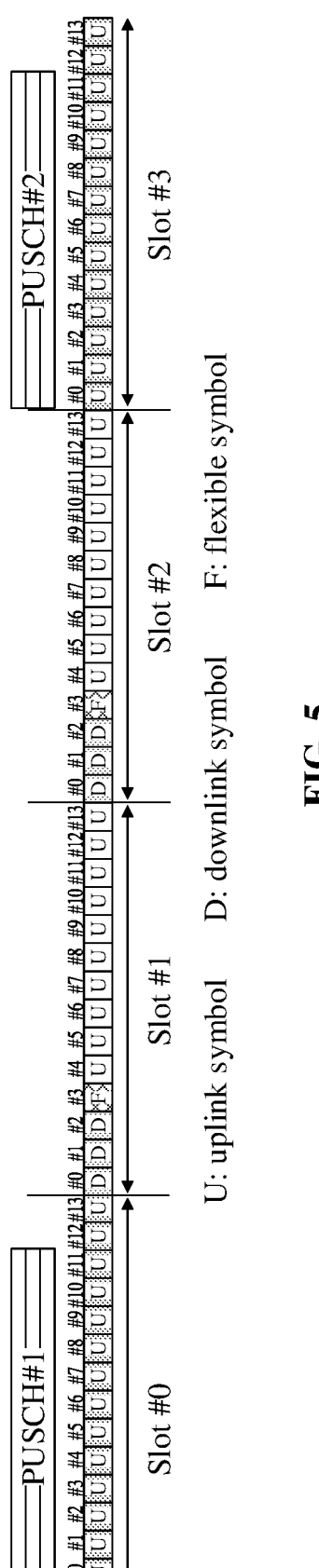
FIG. 5 is a schematic diagram of slot aggregation PUSCH repeated transmission provided in an embodiment of the present application.

For the second mode, a time-domain unit available for repeated transmission is regarded as corresponding to one repeated transmission. Using the PUSCH repeated transmission shown in FIG. 5 as an example, two repeated transmissions are performed in slot #0 and slot #3, the two slots being available for repeated transmission of PUSCH replicas; and repeated transmission is not performed in slot #1 and slot #2, the two slots being unavailable for repeated transmission of the PUSCH replicas. Therefore, in the four slots including slot #0 to slot #3, the number of repeated transmissions is counted as twice. When repeated transmission is performed in the second mode, the coverage performance of repeated transmission may be guaranteed by setting the actual available number of repeated transmissions.

For the third mode, one transport block may be transmitted in two or more slots.

In some embodiments, the parameter of enhanced data transmission includes any one of: the number of repeated transmissions counted on the basis of consecutive time-domain units, the number of repeated transmissions counted on the basis of time-domain units available for repeated transmission, the number of repeated transmissions based on the TB processing over multi-slot, and the number of slots for transmitting a transport block in the TB processing over multi-slot. The number of repeated transmissions may be consecutive or discrete. Using a maximum number of repeated transmissions of 16 as an example, if the number of repeated transmissions is consecutive, the value of the parameter of enhanced data transmission may be {1, 2, 3, 4, 5, 6, 7, 8, 9, 10, 11, 12, 13, 14, 15, 16}, that is, the value of the parameter of enhanced data transmission is 16 different values. If the number of repeated transmissions is discrete, the value of the parameter of enhanced data transmission may be {1, 2, 3, 4, 7, 8, 12, 16}, that is, the value of the parameter of enhanced data transmission is discrete values, the number of which is less than 16.

In some embodiments, the number of repeated transmissions counted on the basis of consecutive time-domain units may be the number of repeated transmissions configured by the network device for the terminal device in mode 1, and the number of repeated transmissions is counted in consecutive time-domain units. The number of repeated transmissions counted on the basis of time-domain units available for repeated transmission may be the number of repeated transmissions configured for the terminal device by the network device in mode 2, and the number of repeated transmissions is counted on the basis of actual time-domain units available for repeated transmission. The number of repeated transmissions based on the TB processing over multi-slot may be the number of repeated transmissions in mode 3. In that scenario, the number of slots for transmitting a transport block in the TB processing over multi-slot may be configured by means of information or parameters other than the first information. If the first information is used to determine the number of slots for transmitting a transport block in the TB processing over multi-slot, the number of repeated transmissions based on the TB processing over multi-slot may be one or a plurality of times. If the number of repeated transmissions based on the TB processing over multi-slot process is a plurality, the number of repeated transmissions based on the TB processing over multi-slot may be configured by means of information or parameters other than the first information.

The method for indicating repeated transmission provided by the present application will be explained below by using examples in which the first information is used to determine the parameter of enhanced data transmission and the repeated transmission mode, the first information is used to determine the parameter of enhanced data transmission, and the first information is used to determine the repeated transmission mode.

In the case where the first information is used to determine the parameter of enhanced data transmission and the repeated transmission mode:

In Scenario 1, the first information includes the parameter of enhanced data transmission; the repeated transmission mode is determined by performing a modulo operation on the number of repeated transmission modes on the basis of the parameter of enhanced data transmission.

During specific implementation, the first information may directly include the parameter of enhanced data transmission, and the repeated transmission mode may be further determined according to the parameter of enhanced data transmission. For example, if the parameter of enhanced data transmission is numberandtypeofrepetitions-R17, the numberandtypeofrepetitions-R17 parameter included in the first information is directly used to represent any one of the number of repeated transmissions counted on the basis of consecutive time-domain units, the number of repeated transmissions counted on the basis of time-domain units available for repeated transmission, the number of repeated transmissions based on the TB processing over multi-slot, and the number of slots for transmitting a transport block in the TB processing over multi-slot. The repeated transmission mode is determined by performing a modulo operation on the number of repeated transmission modes on the basis of the parameter of enhanced data transmission, and if a result of the modulo operation is a first value, the repeated transmission mode is the first mode; or, if the result of the modulo operation is a second value, the repeated transmission mode is the second mode; or, if the result of the modulo operation is a third value, the repeated transmission mode is the third mode.

For example, if there are two repeated transmission modes, namely the first mode and the second mode mentioned above, then the number of repeated transmission modes is 2, and if mod (numberandtypeofrepetitions-R17, 2)==0, then the repeated transmission mode is the first mode. If mod (numberandtypeofrepetitions-R17, 2)==1, then the repeated transmission mode is the second mode. That is, the repeated transmission mode is determined on the basis of the odd-even value of the result of performing the modulo operation on the number of repeated transmission modes according to the parameter of enhanced data transmission.

For another example, if there are three repeated transmission modes, namely the first mode, the second mode, and the third mode mentioned above, then the number of repeated transmission modes is 3, and if mod (numberandtypeofrepetitions-R17, 3)==0, then the repeated transmission mode is the first mode. If mod (numberandtypeofrepetitions-R17, 3)==1, the repeated transmission mode is the second mode. If mod (numberandtypeofrepetitions-R17, 3)==2, the repeated transmission mode is the third mode.

For each implementation in scenario 1, the actual number of repeated transmissions of a transport block may be the same as or different from the number of repeated transmissions indicated by the parameter of enhanced data transmission. In the case where the actual number of repeated transmissions of a transport block is different from the number of repeated transmissions indicated by the parameter of enhanced data transmission, if the number of repeated transmissions indicated by the parameter of enhanced data transmission is N, the terminal device may perform N+M repeated transmissions of the transport block or N−M repeated transmissions of the transport block according to a preset rule or protocol. Similarly, the number of slots for transmitting a transport block in the TB processing over multi-slot may be the same as or different from the number of slots for transmitting a transport block indicated by the parameter of enhanced data transmission. In the case where the number of slots for transmitting a transport block in the TB processing over multi-slot is different from the number of slots for transmitting a transport block indicated by the parameter of enhanced data transmission, if the number of slots for transmitting a transport block indicated by the parameter of enhanced data transmission is N, the terminal device may determine the number N+M or N−M of slots for transmitting the transport block according to a preset rule or protocol.

In Scenario 2, the first information includes an index value, and the index value has a first correspondence relationship with the parameter of enhanced data transmission; and/or, the index value has a second correspondence relationship with the repeated transmission mode.

During specific implementation, the parameter of enhanced data transmission is determined on the basis of the first correspondence relationship; the repeated transmission mode is determined on the basis of the second correspondence relationship; and the first correspondence relationship and the second correspondence relationship may be presented in one configuration table, or may be presented in two separate configuration tables. As shown in Table 2, the first correspondence relationship and the second correspondence relationship are presented in one configuration table. If the first information includes an index value of 0, then the parameter of enhanced data transmission corresponding to the index value 0 is determined to be 2 according to the first correspondence relationship, and the repeated transmission mode corresponding to the index value 0 is determined as the first mode according to the second correspondence relationship. If the first information includes an index value of 8, then the parameter of enhanced data transmission corresponding to the index value 8 is determined to be 4 according to the first correspondence relationship, and the repeated transmission mode corresponding to the index value 0 is determined as the second mode according to the second correspondence relationship.

TABLE 2

| Index value | Type | Number of repetitions/Number of TBoMS slots |
|---|---|---|
| 0 | First mode | 2 |
| 1 | First mode | 4 |
| 2 | First mode | 6 |
| 3 | First mode | 8 |
| 4 | First mode | 12 |
| 5 | First mode | 14 |
| 6 | First mode | 16 |
| 7 | First mode | 32 |
| 8 | Second mode | 4 |
| 9 | Second mode | 6 |
| 10 | Second mode | 8 |
| 11 | Second mode | 10 |
| 12 | Second mode | 12 |
| 13 | Third mode | 2 |
| 14 | Third mode | 4 |
| 15 | Third mode | 6 |
| 16 | Third mode | 8 |

It should be noted that for scenario 2, configuration information for the first mode, the second mode, and the third mode may be predefined. For example, for the first mode and the second mode, the predefined configuration information may be configuration information selected from a supported maximum number of different repetitions; if the supported maximum number of repetitions is Nmax, and Nmax is greater than 16, then the configuration information may be selected from the Nmax different repetitions. Using Nmax=32 as an example, configuration information is selected from 32 different repetitions, less than 32 different values may be selected, for example, 16 pieces of configuration information (such as 2, 4, 6, 8, . . . , 32) or 8 pieces of configuration information (2, 4, 8, 16, 18, 20, 24, 32) are selected for repeated transmission. For the third mode, the predefined configuration information may be selected from the number of slots in TB processing over multi-slot configured. If the number of slots in TB processing over multi-slot is Mmax, and Mmax is greater than 1, then less than Mmax different slots may be selected from 1 to Mmax slots, and configuration information corresponding to the selected slots is used as the predefined configuration information for the third mode. Using Mmax=32 as an example, four values (2, 4, 6, 8) are selected from 1 to 32, and configuration information corresponding to 2 slots, 4 slots, 6 slots, and 8 slots, respectively, in TB processing over multi-slot is used as the predefined configuration information for the third mode; and there is no need to configure all configuration information corresponding to the number of slots ranging from 1 to 32.

In the scenario 2, the network device may determine a group of configurations from Table 2 according to an actual frame structure and a transmission coverage requirement, and transmit an index value of a determined configuration carried in the first information to the terminal device.

In scenario 3, the first information includes a value of a dependent variable of a first function; an independent variable of the first function includes: the parameter of enhanced data transmission and/or the repeated transmission mode.

In some embodiments, the parameter of enhanced data transmission is determined on the basis of the first function and the value of the dependent variable; and the repeated transmission mode is determined on the basis of the first function and the value of the dependent variable.

During specific implementation, the first function may be agreed upon by a protocol, or preset, or notified by the network device to the terminal device. It may also be preset that if the repeated transmission mode is the first mode, a value of the independent variable corresponding to the repeated transmission mode is a fourth value; if the repeated transmission mode is the second mode, the value of the independent variable corresponding to the repeated transmission mode is a fifth value; or, if the repeated transmission mode is the third mode, the value of the independent variable corresponding to the repeated transmission mode is a sixth value.

The first function may be as shown in Table 3 below. For the first mode, the first function may be Value=3*16+K−16−1, where K is the parameter of enhanced data transmission. For the first mode, or the second mode, or the third mode, the first function may be Value=3*(K−1)+Type, where Type is the value of an independent variable corresponding to the first mode or the second mode or the third mode; for example, the first mode corresponds to Type 0, the second mode corresponds to Type 1, and the third mode corresponds to Type 2. For example, if the value of Value carried in the first information is 45, then according to the functional relationship shown in Table 3, it may be determined that the parameter of enhanced data transmission is 16, and the repeated transmission mode is Type 0, which is the first transmission mode. If the Value carried in the first information is 43, then according to the functional relationship shown in Table 3, it may be determined that the parameter of enhanced data transmission is 15, and the repeated transmission mode is Type 1, which is the second transmission mode. If the Value carried in the first information is 29, then according to the functional relationship shown in Table 3, it may be determined that the parameter of enhanced data transmission is 10, and the repeated transmission mode is Type 0, which is the third transmission mode. Table 3 is only an optional example. During specific implementation, the first function may be a functional relationship other than the functional relationships shown in Table 3.

TABLE 3

| Parameter of Enhanced Data Transmission (K) | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| Formula | | | | | | | | | | | | | | | |
| Value = 3 * (K − 1) + Type (Type = 0/1/2) | | | | | | | | | | | | | | | |

| Type | | | | | | | | | | | | | | | | |
|---|---|---|---|---|---|---|---|---|---|---|---|---|---|---|---|---|
| 0 | 0 | 3 | 6 | 9 | 12 | 15 | 18 | 21 | 24 | 27 | 30 | 33 | 36 | 39 | 42 | 45 |
| 1 | 1 | 4 | 7 | 10 | 13 | 16 | 19 | 22 | 25 | 28 | 31 | 34 | 37 | 40 | 43 | 46 |
| 2 | 2 | 5 | 8 | 11 | 14 | 17 | 20 | 23 | 26 | 29 | 32 | 35 | 38 | 41 | 44 | 47 |

TABLE 3-continued

| | | Parameter of Enhanced Data Transmission (K) | | | | | | | | | | | | | | | |
|---|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 | 32 |
| | | | | | | | | | Formula | | | | | | | | |
| | | Value = 3*16 + K − 16 − 1 (Type = 0) | | | | | | | | | | | | | | | |
| Type | 0 | 48 | 49 | 50 | 51 | 52 | 53 | 54 | 55 | 56 | 57 | 58 | 59 | 60 | 61 | 62 | 63 |
| | 1 | — | — | — | — | — | — | — | — | — | — | — | — | — | — | — | — |
| | 2 | — | — | — | — | — | — | — | — | — | — | — | — | — | — | — | 95 |

For the scenario 3, the maximum number of repeated transmissions in the second mode may be 32. An example where the maximum number of repeated transmissions in the second mode is 16 is given herein. For the third mode, an example where the number of slots for which a transport block size may be configured is 16 slots is given. For the third mode, only the number of repeated transmissions may be indicated; or the number of repeated transmissions may not be indicated, and only the number of slots for determining a transport block size may be indicated; or both the number of repeated transmissions and the number of slots for determining a transport block size may be indicated at the same time.

In Scenario 4, the first information at least includes: a first information field and a second information field. The first information field is used to indicate the parameter of enhanced data transmission; and the second information field is used to indicate the repeated transmission mode.

During specific implementation, if the first information includes X bits, then Y bits may be used to indicate the repeated transmission mode, and (X−Y) bits may be used to indicate the parameter of enhanced data transmission. For example, if the repeated transmission mode includes the first mode and the second mode, then the 1-bit second information field may be used to distinguish the first mode and the second mode. For example, the first mode is represented by the bit value of the second information field being 0, and the second mode is represented by the bit value of the second information field being 1. If the parameter of enhanced data transmission is 32, the 5-bit first information field may be used to carry the parameter, that is, the value of the first information field is 00000-11111, respectively indicating that the number of repetitions is 1-32. Therefore, for 16 repeated transmissions in mode 1, the first information may be expressed as 001111, and the highest bit indicates that the transmission mode is mode 1; and for 6 repeated transmissions in mode 1, the first information may be expressed as 101111, and the highest bit indicates that the transmission mode is mode 2.

In the above scenarios 1 to 4 provided by the embodiments of the present application, the parameter of enhanced data transmission and the repeated transmission mode may be determined on the basis of the first information, and there is no need for multiple pieces of information or multiple parameters to respectively indicate the parameter of enhanced data transmission and the repeated transmission mode, thereby improving the utilization efficiency of signaling and reducing system resources.

In Scenario 5, in case that the first information is used to determine the parameter of enhanced data transmission, the method for indicating repeated transmission may further include operation S202.

In S202, the terminal device receives second information transmitted by the network device. The second information is used to determine the repeated transmission mode.

In some embodiments, the second information is carried in upper layer signaling. During specific implementation, the second information may be carried in RRC signaling, a MAC CE, or DCI.

For example, the first information and the second information may be carried in two new columns of parameters added in the TDRA table.

In Scenario 6, in case that the first information is used to determine the repeated transmission mode, the method for indicating repeated transmission may further include operation S202'.

In S202', the terminal device receives third information transmitted by the network device. The third information is used to determine the parameter of enhanced data transmission.

In some embodiments, the third information is carried in upper layer signaling. During specific implementation, the third information may be carried in RRC signaling, a MAC CE, or DCI.

For example, the first information and the third information may be carried in two new columns of parameters added in the TDRA table. The first information and the third information may also be carried in two different pieces of DCI signaling.

In scenario 7, the first information includes information of the parameter of enhanced data transmission and a parameter indicating the repeated transmission mode.

In some embodiments, the first information may include two pieces of independent indication information, in which one piece of indication information is used to indicate the parameter of enhanced data transmission, and the other piece of indication information is used to indicate the parameter of the repeated transmission mode.

In the above scenarios 5 to 7 provided in the embodiments of the present application, the network device may respectively indicate the parameter of enhanced data transmission and the repeated transmission mode to the terminal device, so as to avoid the situation where when the parameter of enhanced data transmission and the repeated transmission mode are jointly indicated by one piece of information, the terminal device needs to further determine the parameter of enhanced data transmission and/or the repeated transmission mode on the basis of received information, thereby reducing processing time of the terminal device.

FIG. 6 shows another optional processing flow of a method for indicating repeated transmission provided in an embodiment of the present application. As shown in FIG. 6, the method may at least include the following operation S301.

In S301, a network device transmits first information to a terminal device. The first information is used to determine a parameter of enhanced data transmission and/or a repeated transmission mode.

In some embodiments, the network device determines a repeated transmission scheme (including the parameter of enhanced data transmission and the repeated transmission mode) according to a frame structure and an actual number of repeated transmissions required; and the network device then transmits the determined repeated transmission scheme to the terminal device through the first information.

In some embodiments, description of the first information and the process of determining the parameter of enhanced data transmission and/or the repeated transmission mode according to the first information are the same as the process shown in S201 above, and will not be repeated herein.

In some embodiments, in case that the first information is used to determine the parameter of enhanced data transmission, the repeated transmission indicating method may further include operation S302.

In S302, the network device transmits second information to the terminal device. The second information is used to determine the repeated transmission mode.

In some embodiments, description of the second information is the same as the description of the second information in S202, and will not be repeated herein.

In some embodiments, in case that the first information is used to determine the repeated transmission mode, the method for indicating repeated transmission may further include operation S302'.

In S302', the network device transmits third information to the terminal device. The third information is used to determine the parameter of enhanced data transmission.

In some embodiments, description of the third information is the same as the description of the third information in S202', and will not be repeated herein.

Figure 7:
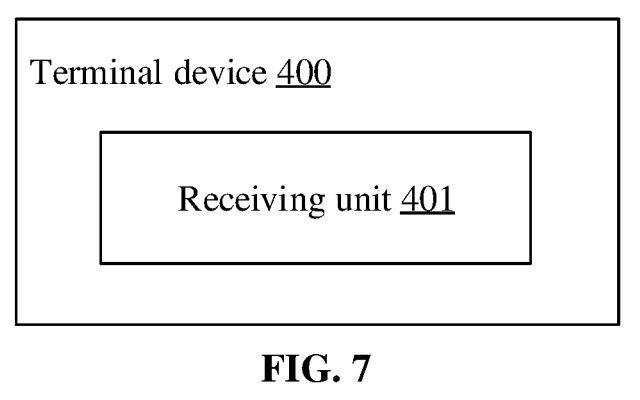

In order to implement the method for indicating repeated transmission provided in the embodiments of the present application, an embodiment of the present application further provides a terminal device. FIG. 7 illustrates an optional composition structure of a terminal device 400, which includes:

a receiving unit 401, configured to receive first information transmitted by a network device. The first information is used to determine a parameter of enhanced data transmission and/or a repeated transmission mode.

In some embodiments, the repeated transmission mode includes at least one of: a first mode, a second mode, and a third mode.

The first mode includes: counting the number of repeated transmissions on the basis of consecutive time-domain units.

The second mode includes: counting the number of repeated transmissions on the basis of time-domain units available for repeated transmission.

The third mode includes: determining a transport block size (TBS) on the basis of at least two slots in TB processing over multi-slot.

In some embodiments, the first information includes the parameter of enhanced data transmission.

The repeated transmission mode is determined by performing a modulo operation on the number of repeated transmission modes on the basis of the parameter of enhanced data transmission.

In some embodiments, in response to a result of the modulo operation being a first value, the repeated transmission mode is the first mode;

or, in response to the result of the modulo operation being a second value, the repeated transmission mode is the second mode;

or, in response to the result of the modulo operation being a third value, the repeated transmission mode is the third mode.

In some embodiments, the first information includes an index value, and the index value has a first correspondence relationship with the parameter of enhanced data transmission;

and/or, the index value has a second correspondence relationship with the repeated transmission mode.

In some embodiments, the parameter of enhanced data transmission is determined on the basis of the first correspondence relationship;

and/or, the repeated transmission mode is determined on the basis of the second correspondence relationship.

In some embodiments, the first information includes a value of a dependent variable of a first function;

an independent variable of the first function includes: the parameter of enhanced data transmission and/or the repeated transmission mode.

In some embodiments, the parameter of enhanced data transmission is determined on the basis of the first function and the value of the dependent variable;

and/or, the repeated transmission mode is determined on the basis of the first function and the value of the dependent variable.

In some embodiments, in response to the repeated transmission mode being the first mode, a value of the independent variable corresponding to the repeated transmission mode is a fourth value;

or, in response to the repeated transmission mode being the second mode, the value of the independent variable corresponding to the repeated transmission mode is a fifth value;

or, in response to the repeated transmission mode being the third mode, the value of the independent variable corresponding to the repeated transmission mode is a sixth value.

In some embodiments, the first information at least includes: a first information field and a second information field.

In some embodiments, the first information field is used to indicate the parameter of enhanced data transmission; and the second information field is used to indicate the repeated transmission mode.

In some embodiments, the first information includes information of the parameter of enhanced data transmission and a parameter indicating the repeated transmission mode.

In some embodiments, in case that the first information is used to determine the parameter of enhanced data transmission, the receiving unit 401 is further configured to receive second information transmitted by the network device. The second information is used to determine the repeated transmission mode.

In some embodiments, the second information is carried in any one of: RRC signaling, a MAC CE, and DCI.

In some embodiments, in case that the first information is used to determine the repeated transmission mode, the receiving unit 401 is further configured to receive third information transmitted by the network device. The third information is used to determine the parameter of enhanced data transmission.

In some embodiments, the second information is carried in any one of: RRC signaling, a MAC CE, and DCI.

In some embodiments, the parameter of enhanced data transmission includes any one of:

the number of repeated transmissions counted on the basis of consecutive time-domain units;

the number of repeated transmissions counted on the basis of time-domain units available for repeated transmission;

the number of repeated transmissions based on the TB processing over multi-slot; and the number of slots for transmitting a transport block in the TB processing over multi-slot.

In some embodiments, the first information is carried in upper layer signaling.

In some embodiments, the upper layer signaling includes any one of: RRC signaling, a MAC CE, and DCI.

In some embodiments, the data transmission is carried on a PUSCH or a PDSCH.

Figure 8:
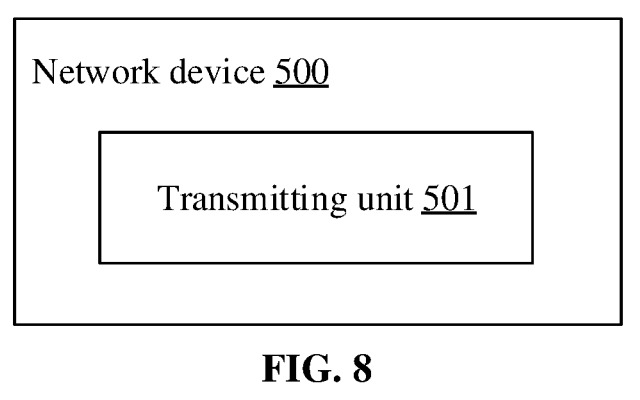

In order to implement the method for indicating repeated transmission provided in the embodiments of the present application, an embodiment of the present application further provides a network device. FIG. 8 illustrates an optional composition structure of a network device 500, which includes:

a transmitting unit 501, configured to transmit first information to a terminal device. The first information is used to determine a parameter of enhanced data transmission and/or a repeated transmission mode.

In some embodiments, the repeated transmission mode includes at least one of: a first mode, a second mode, and a third mode.

The first mode includes: counting the number of repeated transmissions on the basis of consecutive time-domain units.

The second mode includes: counting the number of repeated transmissions on the basis of time-domain units available for repeated transmission.

The third mode includes: determining a transport block size (TBS) on the basis of at least two slots in TB processing over multi-slot.

In some embodiments, the first information includes the parameter of enhanced data transmission.

The repeated transmission mode is determined by performing a modulo operation on the number of repeated transmission modes on the basis of the parameter of enhanced data transmission.

In some embodiments, in response to the result of the modulo operation being a first value, the repeated transmission mode is the first mode;

or, in response to the result of the modulo operation being a second value, the repeated transmission mode is the second mode;

or, in response to the result of the modulo operation being a third value, the repeated transmission mode is the third mode.

In some embodiments, the first information includes an index value, and the index value has a first correspondence relationship with the parameter of enhanced data transmission;

and/or, the index value has a second correspondence relationship with the repeated transmission mode.

In some embodiments, the parameter of enhanced data transmission is determined on the basis of the first correspondence relationship;

and/or, the repeated transmission mode is determined on the basis of the second correspondence relationship.

In some embodiments, the first information includes a value of a dependent variable of a first function;

an independent variable of the first function includes: the parameter of enhanced data transmission and/or the repeated transmission mode.

In some embodiments, the parameter of enhanced data transmission is determined on the basis of the first function and the value of the dependent variable;

and/or, the repeated transmission mode is determined on the basis of the first function and the value of the dependent variable.

In some embodiments, in response to the repeated transmission mode being the first mode, a value of the independent variable corresponding to the repeated transmission mode is a fourth value;

or, in response to the repeated transmission mode being the second mode, the value of the independent variable corresponding to the repeated transmission mode is a fifth value;

or, in response to the repeated transmission mode being the third mode, the value of the independent variable corresponding to the repeated transmission mode is a sixth value.

In some embodiments, the first information at least includes: a first information field and a second information field.

In some embodiments, the first information field is used to indicate the parameter of enhanced data transmission; and the second information field is used to indicate the repeated transmission mode.

In some embodiments, the first information includes information of the parameter of enhanced data transmission and a parameter indicating the repeated transmission mode.

In some embodiments, in case that the first information is used to determine the parameter of enhanced data transmission, the transmitting unit 501 is further configured to transmit second information to the terminal device. The second information is used to determine the repeated transmission mode.

In some embodiments, the second information is carried in any one of: RRC signaling, a MAC CE, and DCI.

In some embodiments, in case that the first information is used to determine the repeated transmission mode, the transmitting unit 501 is further configured to transmit third information to the terminal device. The third information is used to determine the parameter of repeated data transmission.

In some embodiments, the second information is carried in any one of: RRC signaling, a MAC CE, and DCI.

In some embodiments, the parameter of enhanced data transmission includes any one of:

the number of repeated transmissions counted on the basis of consecutive time-domain units;

the number of repeated transmissions counted on the basis of time-domain units available for repeated transmission;

the number of repeated transmissions based on the TB processing over multi-slot; and the number of slots for transmitting a transport block in the TB processing over multi-slot.

In some embodiments, the first information is carried in upper layer signaling.

In some embodiments, the upper layer signaling includes any one of: RRC signaling, a MAC CE, and DCI.

In some embodiments, the data transmission is carried on a PUSCH or a PDSCH.

It should be noted that in the above embodiments of the present application, the function of the receiving unit 401 may be implemented by a transceiver or a receiver, and the function of the transmitting unit 501 may be implemented by a transceiver or a transmitter. A processor in the terminal device may be configured to determine the parameter of enhanced data transmission and/or the repeated transmission mode.

An embodiment of the present application further provides a terminal device, including a processor and a memory for storing a computer program that can be run on the processor. The processor is configured to perform, when running the program, the operations of the foregoing method for indicating repeated transmission performed by a terminal device.

An embodiment of the present application further provides a network device, including a processor and a memory for storing a computer program that can be run on the processor. The processor is configured to perform, when running the program, the operations of the foregoing method for indicating repeated transmission performed by a network device.

An embodiment of the present application further provides a chip, including: a processor, configured to invoke and run a computer program from a memory, such that a device equipped with the chip performs the foregoing method for indicating repeated transmission performed by a terminal device.

An embodiment of the present application further provides a chip, including: a processor, configured to invoke and run a computer program from a memory, such that a device equipped with the chip performs the foregoing method for indicating repeated transmission is performed by a network device.

An embodiment of the present application further provides a storage medium storing an executable program that, when executed by a processor, implements the foregoing method for indicating repeated transmission performed by a terminal device.

An embodiment of the present application further provides a storage medium storing an executable program that, when executed by a processor, implements the foregoing method for indicating repeated transmission performed by a network device.

An embodiment of the present application further provides a computer program product, including computer program instructions, which cause a computer to perform the foregoing method for indicating repeated transmission performed by a terminal device.

An embodiment of the present application further provides a computer program product, including computer program instructions, which cause a computer to perform the foregoing method for indicating repeated transmission performed by a network device.

An embodiment of the present application further provides a computer program, and the computer program causes a computer to perform the foregoing method for indicating repeated transmission performed by a terminal device.

An embodiment of the present application further provides a computer program, and the computer program causes a computer to perform the foregoing method for indicating repeated transmission performed by a network device.

Figure 9:
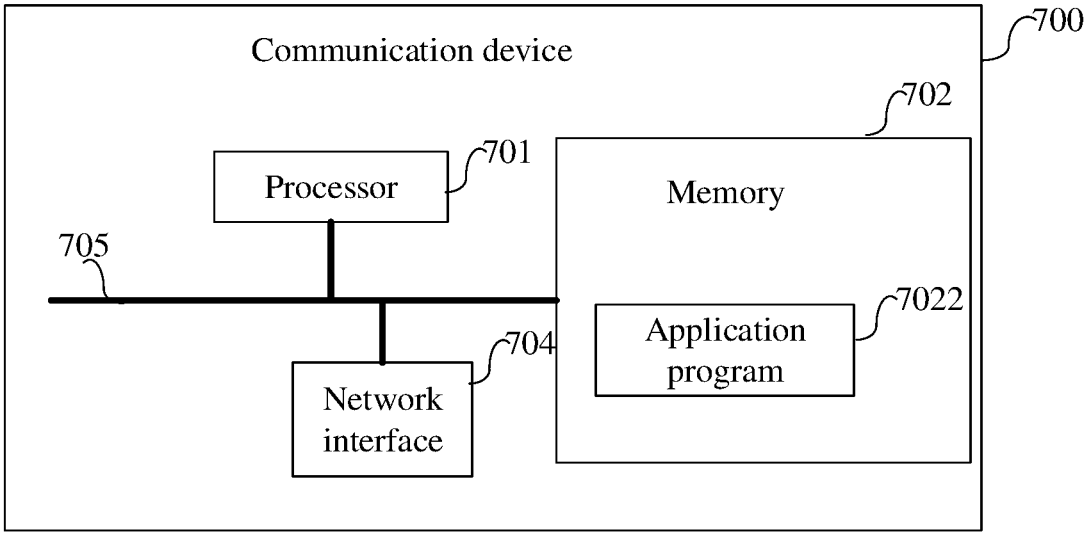
FIG. 9 is a schematic diagram of a hardware composition structure of an electronic device provided in an embodiment of the present application.

FIG. 9 is a schematic diagram of a hardware structure of an electronic device (a terminal device or network device) according to an embodiment of the present application. The electronic device 700 includes: at least one processor 701, a memory 702, and at least one network interface 704. Various components in the electronic device 700 are coupled together through a bus system 705. It can be understood that the bus system 705 is used to enable connection and communication between these components. In addition to a data bus, the bus system 705 further includes a power bus, a control bus, and a state signal bus. However, for the sake of clarity, the various buses are labeled as the bus system 705 in FIG. 9.

It can be understood that the memory 702 may be a volatile memory or a non-volatile memory, or may include both volatile and non-volatile memories. The non-volatile memory can be a ROM, a programmable read-only memory (PROM), an erasable programmable read-only memory (EPROM), an electrically erasable programmable read-only memory (EEPROM), a ferromagnetic random-access memory (FRAM), a flash memory, a magnetic surface memory, an optical disc, or a compact disc read-only memory (CD-ROM). The magnetic surface memory can be a disk memory or a tape memory. The volatile memory can be a random-access memory (RAM), which acts as an external cache. By way of illustration but not limitation, many forms of RAMs are available, such as a static random-access memory (SRAM), a synchronous static random-access memory (SSRAM), a dynamic random-access memory (DRAM), a synchronous dynamic random-access memory (SDRAM), a double data rate synchronous dynamic random-access memory (DDRSDRAM), an enhanced synchronous dynamic random-access memory (ESDRAM), a SyncLink dynamic random-access memory (SLDRAM), and a direct Rambus random-access memory (DRRAM). The memory 702 described in the embodiments of the present application is intended to include but not limited to these memories and any other suitable types of memories.

The memory 702 in the embodiments of the present application is used to store various types of data to support the operations of the electronic device 700. Examples of such data include: any computer programs for operating on the electronic device 700, such as an application program 7022. A program for implementing the method of the embodiments of the present application can be included in the application program 7022.

The method disclosed in the foregoing embodiments of the present application can be applied to the processor 701 or implemented by the processor 701. The processor 701 may be an integrated circuit chip having signal processing capabilities. During implementation, each operation in the method described above can be completed by an integrated logic circuit of hardware or instructions in the form of software in the processor 701. The aforementioned processor 701 may be a general processor, a digital signal processor (DSP), or other programmable logic devices, discrete gate or transistor logic devices, discrete hardware components, and the like. The processor 701 can implement or execute the various methods, operations, and logic block diagrams disclosed in the embodiments of the present application. The general-purpose processor may be a microprocessor or any conventional processor, and the like. The operations of the methods disclosed in combination with the embodiments of the present application may be directly executed and completed by a hardware decoding processor, or executed and completed by a combination of hardware and software modules in the decoding processor. The software module may be located in a storage medium, and the storage medium is located in the memory 702. The processor 701 reads the information in the memory 702, and completes the operations of the foregoing method in combination with hardware thereof.

In an exemplary embodiment, the electronic device 700 can be implemented by one or a plurality of application specific integrated circuits (ASICs), DSPs, programmable logic devices (PLDs), complex programmable logic devices (CPLDs), FPGAs, general-purpose processors, controllers, MCUs, MPUs, or other electronic components, so as to execute the foregoing method.

The present application is described with reference to flowcharts and/or block diagrams of the methods, devices (systems), and computer program products according to the embodiments of the present application. It should be understood that each procedure and/or block in the flowchart and/or block diagram, and a combination of procedures and/or blocks in the flowchart and/or block diagram can be implemented by computer program instructions. These computer program instructions can be provided to a processor of a general purpose computer, a special purpose computer, an embedded processor, or other programmable data processing devices to produce a machine, such that instructions executed by the processor of the computer or other programmable data processing devices produce an apparatus for implementing the functions specified in one or a plurality of procedures in the flowchart and/or one or a plurality of blocks in the block diagram.

These computer program instructions can also be stored in a computer-readable memory capable of directing a computer or other programmable data processing devices to operate in a specific manner, such that the instructions stored in the computer-readable memory produce an article of manufacture including an instruction means, wherein the instruction means implements the functions specified in one or a plurality of procedures in the flowchart and/or one or a plurality of blocks in the block diagram.

These computer program instructions can also be loaded onto a computer or other programmable data processing devices, causing a series of operational operations to be performed on the computer or other programmable devices to produce a computer-implemented process, such that the instructions executed on the computer or other programmable data processing devices provide operations for implementing the functions specified in one or a plurality of procedures in the flow diagram and/or one or a plurality of blocks in the block diagram.

It should be understood that the terms "system" and "network" herein are often used interchangeably herein. The term "and/or" herein is merely to describe the associations between associated objects, indicating that there can be three kinds of relationships. For example, A and/or B can indicate three situations in which A exists alone, A and B exist simultaneously, or B exists alone. In addition, the character "/" herein generally indicates that the associated objects before and after this character are in an "or" relationship.

Described above are only preferred embodiments of the present application, which are not intended to limit the protection scope of the present application. Any modifications, equivalent replacements, and improvements made within the spirit and principles of the present application shall be included within the protection scope of the present application.

The invention claimed is:

1. A method for indicating repeated transmission, the method comprising:
  receiving, by a terminal device, first information transmitted by a network device, wherein the first information is used to determine a parameter of enhanced data transmission and a repeated transmission mode,

wherein the repeated transmission mode comprises at least two of a first mode, a second mode, or a third mode;
  the first mode comprises: counting a number of repeated transmissions on the basis of consecutive time-domain units;
  the second mode comprises: counting the number of repeated transmissions on the basis of time-domain units available for repeated transmission; and
  the third mode comprises: determining a transport block size on the basis of at least two slots in transport block (TB) processing over multi-slot.

2. The method according to claim 1, wherein the first information is carried in upper layer signaling.

3. The method according to claim 2, wherein the upper layer signaling comprises any one of:
  RRC signaling;
  a MAC CE; and
  DCI.

4. A method for indicating repeated transmission, the method comprising:
  transmitting, by a network device, first information to a terminal device, wherein the first information is used to determine a parameter of enhanced data transmission and a repeated transmission mode,
  wherein the repeated transmission mode comprises at least two of a first mode, a second mode, or a third mode;
  the first mode comprises: counting a number of repeated transmissions on the basis of consecutive time-domain units;
  the second mode comprises: counting the number of repeated transmissions on the basis of time-domain units available for repeated transmission; and
  the third mode comprises: determining a transport block size on the basis of at least two slots in transport block (TB) processing over multi-slot.

5. The method according to claim 4, wherein the first information is carried in upper layer signaling,
  wherein the upper layer signaling comprises any one of:
  RRC signaling;
  a MAC CE; and
  DCI.

6. A terminal device, comprising:
  a transceiver, configured to receive first information transmitted by a network device, wherein the first information is used to determine a parameter of enhanced data transmission and a repeated transmission mode,
  wherein the repeated transmission mode comprises at least two of a first mode, a second mode, or a third mode;
  the first mode comprises: counting a number of repeated transmissions on the basis of consecutive time-domain units;
  the second mode comprises: counting the number of repeated transmissions on the basis of time-domain units available for repeated transmission; and
  the third mode comprises: determining a transport block size on the basis of at least two slots in transport block (TB) processing over multi-slot.

7. The terminal device according to claim 6, wherein the first information is carried in upper layer signaling.

8. The terminal device according to claim 7, wherein the higher layer signaling comprises any one of:
  RRC signaling;
  a MAC CE; and
  DCI.

9. A network device, comprising:

a transceiver, configured to transmit first information to a terminal device, wherein the first information is used to determine a parameter of enhanced data transmission and a repeated transmission mode, wherein the repeated transmission mode comprises at least two of a first mode, a second mode, or a third mode;

the first mode comprises: counting a number of repeated transmissions on the basis of consecutive time-domain units;

the second mode comprises: counting the number of repeated transmissions on the basis of time-domain units available for repeated transmission; and the third mode comprises: determining a transport block size on the basis of at least two slots in transport block (TB) processing over multi-slot.

10. The network device according to claim 9, wherein the first information is carried in upper layer signaling, wherein the upper layer signaling comprises any one of:
RRC signaling;
a MAC CE; and
DCI.

11. The method according to claim 1, wherein the first information comprises the parameter of the enhanced data transmission; and the repeated transmission mode is determined by performing a modulo operation on the number of repeated transmission modes on the basis of the parameter of the enhanced data transmission, wherein if a result of the modulo operation is a first value, the repeated transmission mode is the first mode; or, if the result of the modulo operation is a second value, the repeated transmission mode is the second mode; or, if the result of the modulo operation is a third value, the repeated transmission mode is the third mode.

12. The method according to claim 1, wherein the first information comprises an index value, and at least one of the following is specified:

the index value has a first correspondence relationship with the parameter of the enhanced data transmission;

or the index value has a second correspondence relationship with the repeated transmission mode, wherein at least one of the following is implemented:

the parameter of the enhanced data transmission is determined on the basis of the first correspondence relationship; or the repeated transmission mode is determined on the basis of the second correspondence relationship.

13. The method according to claim 4, wherein the first information comprises a value of a dependent variable of a first function; and an independent variable of the first function comprises at least one of: the parameter of the enhanced data transmission or the repeated transmission mode, wherein at least one of the following is implemented:

the parameter of the enhanced data transmission is determined on the basis of the first function and the value of the dependent variable; or the repeated transmission mode is determined on the basis of the first function and the value of the dependent variable.

14. The method according to claim 13, wherein in response to the repeated transmission mode being the first mode, a value of the independent variable corresponding to the repeated transmission mode is a fourth value; or in response to the repeated transmission mode being the second mode, the value of the independent variable corresponding to the repeated transmission mode is a fifth value; or in response to the repeated transmission mode being the third mode, the value of the independent variable corresponding to the repeated transmission mode is a sixth value.

15. The method according to claim 4, wherein the first information at least comprises: a first information field and a second information field, wherein the first information field is used to indicate the parameter of the enhanced data transmission; and the second information field is used to indicate the repeated transmission mode.

* * * * *